Sept. 29, 1959 J. P. HAAS 2,906,106
SPINDLE ASSEMBLY
Filed Jan. 12, 1956 3 Sheets-Sheet 1
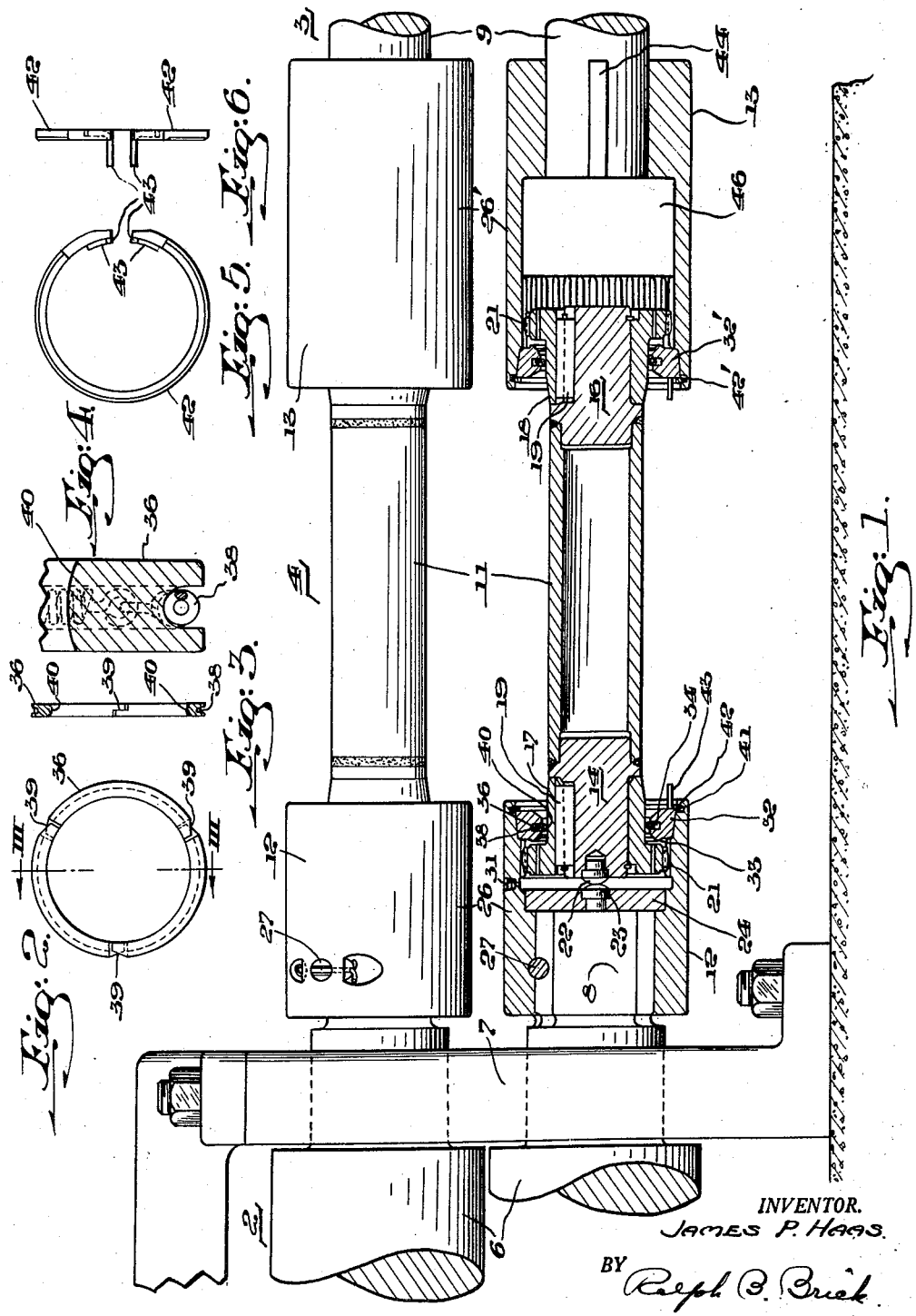
INVENTOR.
JAMES P. HAAS.
BY Ralph B. Brick
his ATTORNEY Sept. 29, 1959 J. P. HAAS 2,906,106
SPINDLE ASSEMBLY
Filed Jan. 12, 1956 3 Sheets-Sheet 2
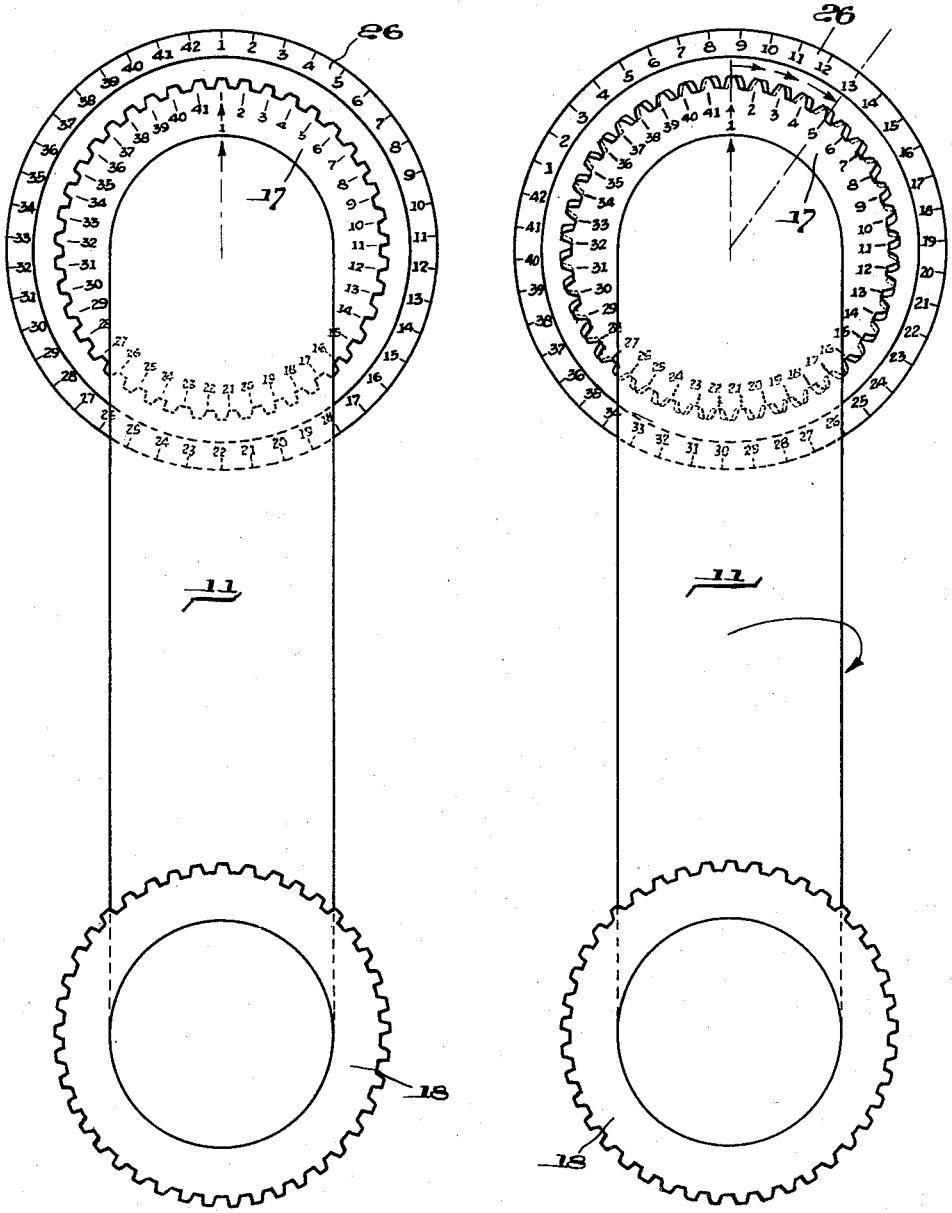
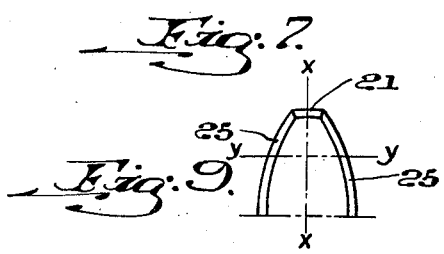
INVENTOR.
JAMES P. HAAS.
BY
Ralph B. Buick
his ATTORNEY Sept. 29, 1959        J. P. HAAS        2,906,106
SPINDLE ASSEMBLY Filed Jan. 12, 1956        3 Sheets-Sheet 3

INVENTOR.
JAMES P. HAAS
BY Ralph B. Brick
his ATTORNEY

United States Patent Office 2,906,106
Patented Sept. 29, 1959

2,906,106

SPINDLE ASSEMBLY

James P. Haas, Baltimore, Md., assignor to Koppers Company, Inc., a corporation of Delaware Application January 12, 1956, Serial No. 558,689

14 Claims. (Cl. 64—9)

This invention relates to coupling assemblies for connecting drive and driven members, and more particularly to a floating spindle coupling assembly including flexible coupling means for connecting the opposite ends of a spindle to the drive and driven members, the coupling assembly permitting rapid coupling and uncoupling of such members.

In situations where power is to be transmitted between spaced drive and driven members, it frequently is desirable to accomplish the power transmission through a spindle having its opposite ends connected by flexible coupling means to the respective ends of the spaced drive and driven members, the spindle being retractable from the driven member to free the same. Such a situation exists in the steel industry where, in certain types of rolling mills, the rolls to be replaced are removed vertically from their rolling mill housings. Since the replacement rolls are frequently of different diameters from the rolls which they replace, a coupling assembly which includes a retractable spindle is required to connect each of such replacement rolls to its drive member. More particularly, this coupling assembly is comprised of roll end coupling means secured to the roll to be driven, a drive end coupling means secured to the spaced drive member used to drive such roll, and a spindle positioned intermediate the roll end and drive end coupling means to connect the same. The spindle is provided at its extremities with hubs, each hub having a plurality of external gear teeth disposed thereon engageable with a plurality of internal gear teeth disposed in the coupling means with which the hub cooperates.

In the past, the coupling assemblies as above described have been comparatively difficult to operate, requiring considerable time for connection and disconnection between the drive and driven members. Moreover, added personnel have been required to effect the coupling operations, it being frequently necessary to inch gradually either the drive or driven member to align properly one member with respect to the other for ready engagement of the external teeth on the hubs of the spindle with the internal teeth disposed in the respective coupling means. Such inching, for example in instances where each of the driven members comprises a roll of a rolling mill, cannot be accomplished by simple means, the bearings supporting the roll generally being water lubricated fiber bearings which tightly clamp the roll. Similarly, the drive member cannot be inched either. Furthermore, the coupling means which have been used in such coupling assemblies have been provided with complex and difficult to assemble sealing arrangements for maintaining the lubricants, such as grease, in the coupling boxes, the sealing arrangements having rapidly wearing parts which require frequent replacement.

The present invention eliminates these aforementioned disadvantages, providing a floating spindle coupling assembly for connecting spaced drive and driven members which can be readily assembled and disassembled in a minimum of time and with a minimum of effort, the coupling assembly further providing for occasional misalignment of the coupled spaced members. In addition, the present invention provides flexible coupling means incorporated in such an assembly which have straightforward and rapidly assemblable sealing structures for maintaining lubricating materials in contact with the coupling means over long periods of time.

Various other features of the present invention will become apparent to one skilled in the art with a reading of the disclosure set forth hereinafter.

More particularly, the present invention provides a floating spindle coupling assembly for connecting spaced drive and driven members comprising a first coupling box securable to one of the spaced members, the first coupling box having a hub receiving opening with $n$ number of internal gear teeth disposed therein, a second coupling box securable to the other of the spaced members, the second coupling box having a hub receiving opening with $n+$ at least 1 (one) number of internal gear teeth disposed therein, a spindle positioned intermediate the first and second coupling boxes to transmit power from one member to the other, the spindle including a first hub at one end thereof with $n$ number of external gear teeth disposed thereon engageable with the $n$ number of internal gear teeth disposed in the opening of the first coupling box and a second hub at the other end of the spindle with $n+$ at least 1 (one) number of external gear teeth disposed thereon engageable with the corresponding $n+$ at least 1 (one) number of internal gear teeth disposed in the opening of the second coupling box, one tooth on the first hub of the spindle being substantially in line with one tooth on the second hub of the spindle, at least one of the coupling boxes being provided with chamber means for the telescopic movement of the spindle therein, metal sealing ring means yieldably urged into contact with the outer surface of the spindle adjacent the external gear teeth on the hub, retaining means cooperative with the coupling boxes adjacent the sealing ring means to retain the sealing ring means in place, and indexing means for the spindle coupling assembly to provide for alignment of the teeth of the spindle for proper engagement of the teeth on the opposite spindle hubs with the teeth in the respective coupling boxes.

It is to be understood that various changes can be made by one skilled in the art, in the arrangement, form, and construction of the apparatus disclosed hereinafter without departing from the scope or spirit of the present invention.

Referring to the drawings:

Figure 1 is a side elevational view, partly in section, of one advantageous embodiment of the present invention shown in connection with a partially disclosed rolling mill;

Figure 2 is an enlarged face view of the segmental sealing ring assembly disclosed in Figure 1;

Figure 3 is a cross-sectional view of the sealing ring assembly of Figure 2 taken in a plane passing through the line III—III of Figure 2;

Figure 4 is a greatly enlarged fragmentary sectional view of the sealing ring assembly of Figures 2 and 3, disclosing in more specific detail the resilient means for holding the segmental sealing ring together and into yieldable contacting relationship with the spindle;

Figure 5 is a face view of the snap ring member disclosed in Figure 1;

Figure 6 is an edge view of the snap ring member of Figure 5;

Figure 7 is a schematic, semi-isometric view of the assembly disclosed in Figure 1, cited along the spindle of the assembly to show the relation of the indexing markings on the coupling box and the hub of the spindle engageable in the opening of such coupling box;

Figure 8 is a view similar to Figure 7 wherein the rolls have just been changed to carry a new roll end coupling box, the front hub of the spindle abutting against the back end of the roll end coupling box with the index markings on the front hub indicating the position of the drive end coupling box teeth;

Figure 8 is a profile view of one of the external teeth disposed on the hub of the spindle, disclosing one advantageous embodiment for the shape of teeth which can be used with the present invention;

Figure 10:
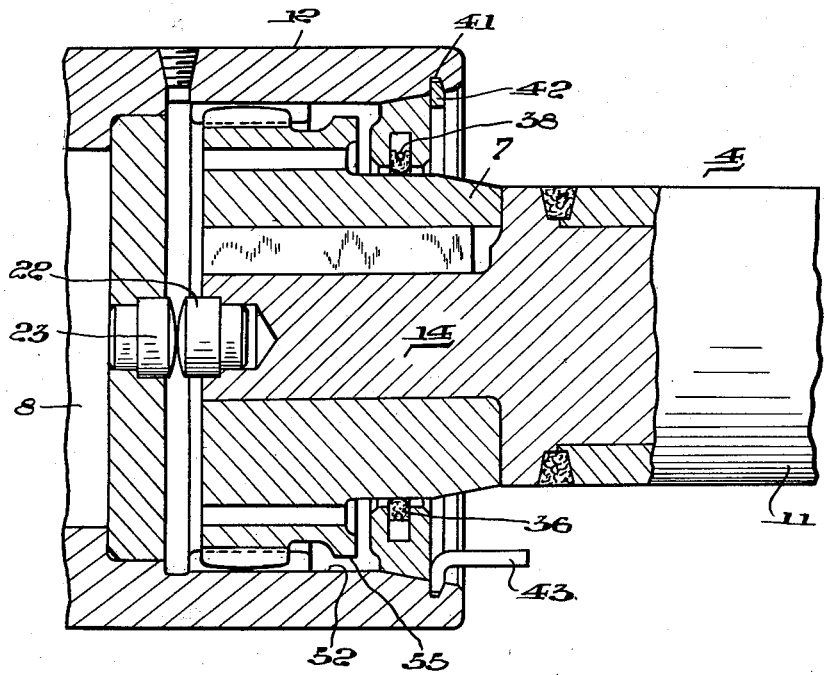
Figure 10 is an enlarged sectional view of a modified coupling box including a land support portion.

Referring to Figure 1 of the drawings, there are disclosed broadly a driven member 2, a spaced drive member 3, and a floating spindle coupling assembly 4 for connecting the spaced drive and driven member.

The driven member 2, as disclosed in Figure 1, comprises a conventional rolling mill having a pair of cooperating horizontal rolls 6 carried by bearing blocks (not shown) disposed in housing members 7 of the mill in a known manner. As is also known in the rolling mill art, rolls 6 can be removed vertically from the rolling mill housing 7, the rolls each having a roll neck and a drive connecting portion 8 extending outside the housing member.

The drive member 3 comprises a pair of conventional drive shafts 9 which can be geared together and connected to a main mill power source as is also known in the art.

The floating spindle coupling assembly 4 comprises a pair of floating spindle members 11 and a pair of flexible coupling members 12 and 13 disposed at opposite ends of each of the spindles, the flexible coupling members 12 and 13 connecting the spindles 11 with the rolls 6 of the driven member 2 and the shafts 9 of the drive member 3 respectively. More particularly, the spindle members 11 each include opposite hub end portions 14 and 16 which are shrunk and welded to the opposite ends of the main body of the spindle, these opposite hub end portions 14 and 16, in turn, being provided with hubs 17 and 18 respectively, each of which is keyed to its hub end portion by slot and key arrangement 19. Integral with each of hubs 17 and 18 are a plurality of external gear teeth, one hub having $n$ number of teeth and the other hub having $n+$ at least 1 (one) number of teeth disposed thereon, with one tooth on one hub of the spindle being substantially in line with one tooth on the other hub of the spindle. In the advantageous embodiment of the invention disclosed and as can be seen from the drawings, the hubs 17 near the rolls 6, otherwise referred to as the front hubs, each have 42 teeth disposed thereon and the hubs 18 near the drive shafts 9, otherwise referred to as the rear hubs, each have 41 teeth disposed thereon. It is to be understood that other combinations in the number of teeth besides that disclosed can also be used when so desired.

As can be seen in Figures 1 and 9 of the drawings, the teeth of each hub have convexly curved tip portions as indicated by the reference numeral 21. These tip portions 21 ride on the root surfaces of the corresponding internal teeth of the flexible coupling members to be described hereinafter to provide for misalignment and to help center the hub.

Referring, more particularly to Figure 9 of the drawings, it can be seen that in the advantageous embodiment of the invention shown, the side faces of each of the external teeth on the hubs are also convexly curved as indicated by the reference numeral 25, in order to allow for large misalignment. The curved shape disclosed is generated by displacing an arc of involute in such a manner that each point of the arc follows a curved trajectory, each trajectory being in a plane Y—Y perpendicular to plane X—X bisecting the tooth longitudinally. The tooth shape obtained in this manner is the shape cut by a Fellows gear shaper, the curved trajectory being produced by a suitable cam. Thus, with such a tooth shape for each external tooth of each hub, large misalignment of the hubs is permitted with respect to the coupling boxes of the flexible coupling members with which said hubs cooperate, as will be seen hereinafter.

Referring to Figure 1, the front hub end portion 14 of each spindle is provided with a thrust button 22 replaceably mounted therein to abut oppositely disposed thrust button 23 mounted in thrust plate 24 carried by the coupling box 26, which is described hereinafter. These thrust buttons are pressed into the end portions of the hub and thrust plate respectively, and are of metal, serving to absorb the occasional thrust that occurs between the drive and driven member and the floating spindle coupling assembly and avoiding frequent replacement of the parts with which they are associated.

The flexible coupling member 12 of each pair of coupling members for each floating spindle includes the aforementioned coupling box 26. Coupling box 26 has one end thereof locked to the drive connecting portion 8 of the rolls 6 by means of the pin and cotter pin arrangement 27. The other end of the coupling box has a hub receiving opening disclosed therein to receive the adjacent hub end portion 14 and the hub 17 keyed thereto. This opening is frustrum shaped tapering outwardly from the teeth of the coupling box toward the entrance face, providing a flared entrance opening to permit easier assembly and disassembly of the sealing ring carrier described hereinafter and also providing a certain amount of guidance when the spindle is pushed forward for reassembly, as also will be described hereinafter. Disposed within the opening are a plurality of internal gear teeth which are cut straight and which are adapted to be engaged by the aforedescribed shaped external gear teeth on the hub of the spindle, providing a means to transmit motion from the spindle through the coupling box to the roll. It will be obvious that the coupling box is provided with the same number of internal teeth as there are external teeth on the hub portion engageable therewith, and, in the advantageous embodiment of the invention disclosed, 42 teeth are used.

Referring to Figures 1 and 10 of the drawings, it can be seen that the coupling box 26 is provided with a lubrication port 31 which communicates with the hub receiving opening therein. To maintain lubricants, such as grease, introduced into the coupling box through this port, the box is provided with a sealing ring means. The sealing ring means comprises a sealing ring carrier 32 which is frustum shaped to nest in the frustum shaped opening of the coupling box 26. The carrier is provided with a curved bumper face 33 against which the back face of the hub portion may abut without damage being done to the teeth during driving operation, and the carrier can be split or solid, depending upon whether it is desired to replace the sealing ring carried thereby without removing one of the hubs. In the advantageous embodiment disclosed, the sealing ring carrier is shown as solid.

A groove 34 is disposed along the inner face of the sealing ring carrier, this groove providing a means to accommodate segmental shaft sealing ring 36 which is disposed therein. The sealing ring 36 can be made of two or more segments in accordance with desired design, the segments being held together by a garter spring 38 and yieldably urged into contact with the shaft by such garter spring. As can be seen in Figure 3 of the drawings, the segments are provided with end lap joint arrangements 39 as is known in the art. The segments can be made of metal and the inner face of the ring is convex in shape as indicated by the reference numeral 40 (Fig. 3) to permit for misalignment of the spindle.

To maintain the sealing ring carrier in proper position with the coupling box, the coupling box is provided with internal groove 41 at the flared end portion thereof to accommodate snap ring 42. Ring 42 is in the form of a split ring having inturned ear portions 43 integral therewith which serve as readily accessible and manipulatable gripping members for contraction of the ring during assembly and disassembly of such ring into and from groove 41.

It is to be understood that each of the flexible coupling members 13 for each spindle is provided with substantially the same sealing ring arrangement as described for the flexible couplings 12, each flexible coupling connecting each of the rear end hubs 18 to each of the drive shafts 9; and each flexible coupling member 13 being provided with a sealing ring carrier 32' and snap ring 42' adapted to cooperate with the coupling box 26' in substantially the same manner as that described for the flexible coupling 12. As can be seen in Figure 1 of the drawings, the coupling box 26' is connected to the drive shaft 9 through a slot and key arrangement 44. It is to be noted that coupling box 26' is further provided with a retracting chamber 46. This retracting chamber permits the retraction of the spindle 11 prior to removal of a roll 6 so that hub 18 telescopes into the coupling box 26', the external teeth on rear hub 18 of the spindle being moved out of engagement with the internal teeth of the coupling box 26' and the external teeth on front hub 17 being moved out of engagement with the internal teeth of coupling box 26 when the spindle is retracted, for reasons described hereinafter, thus permitting the spindle to be rotated freely relative the coupling boxes.

Referring to Figures 7 and 8 of the drawings, it is to be noted that 42 equally spaced graduations are milled circumferentially on the entrance face of each roll end coupling box 26. These graduations coincide with the centerlines of the internal gear grooves disposed in the opening of the box as aforedescribed. Milled on the back face of each front hub 17, as near to the external gear teeth disposed thereon as practicable, are 41 graduations spaced equally and circumferentially around the hub. One of the 41 graduations lines up with the centerline of that aforedescribed front hub tooth which is in alignment with one of the 41 rear hub teeth. This particular graduation is so marked with an arrowhead as disclosed. It will be obvious that with such an arrangement, the 41 graduations milled on the rear of the front hub will line up with the centerlines of the 41 teeth on the rear hub. With such index markings as described, it is possible to quickly adjust the spindles during assembly operations to a position where the external teeth on the front and rear hubs of each of the spindles engage readily with the internal teeth of their respective coupling boxes 26 and 26' connected to the driven and drive members respectively. The method of utilizing this indexing arrangement is a comparatively simple one as can be seen from the description of the reassembling operation set forth hereinafter.

Assume that rolls 6 have just been changed and both spindles are fully retracted so that the rear hub teeth on each spindle are disposed in the retracting chambers 46 and do not engage the drive end coupling box internal teeth. Each new roll carries a new coupling box 26. It is now desired to push each spindle forward so that the external teeth on the front and rear hubs thereof will engage freely with the internal teeth of their respective coupling boxes. If the bearings supporting the rolls are water-lubricated fiber bearings, as is generally the case, they tend to clamp the rolls tightly and inching of the rolls by simple means is difficult. The drive shafts 9 as well cannot be inched. With the spindle arrangement described herein, it is possible to reassemble both spindles without turning either the rolls or the drive shafts.

Each spindle is moved forward so that the front end of the front hub teeth abut against the back end of the front end coupling box internal teeth, the rear hub teeth engaging the internal teeth disposed in the coupling box 26'. The graduations milled on the back face of the front hub will indicate the position of the drive end coupling box teeth. With the observation of the 41 graduations on the back face of the front hub and the 42 graduations on the back face of the roll end coupling box, it will be noted that there is one graduation on the front hub which lines up substantially more so than any other graduation on the front hub with one graduation on the back face of the roll end coupling box. At that particular position noted, one tooth of the roll end coupling box will be substantially in line with one tooth of the rear or drive coupling box.

The spindle to be placed in operation is then moved back until the rear hub teeth are once again disengaged from the internal teeth of coupling box 26' and, the spindle is then rotated so that the arrow mark on the spindle, which has been described as indicating the two teeth on the opposite hub ends of the spindle in alignment, corresponds in position to the position of each particular graduation observed in the previous step. In such position, the teeth on both hubs of the spindle will be able to engage the internal teeth of both coupling boxes without interference and the spindle can be moved forward for such engagement with an easy motion. This having been accomplished, the sealing ring carriers can be quickly and easily nested in the hub receiving openings of the coupling boxes and the snap rings 41 inserted in the grooves 42 to retain such sealing ring carriers in proper position.

As a further refinement of the present invention, a cylindrical land portion 52 with its inner surface parallel to the longitudinal axis of the coupling box can be added between the teeth of the coupling box and the beginning of the portion which tapers toward the entrance opening of the box. This land portion serves to provide a support means for the hub of the spindle during assembly to enable proper centering of the hub, such proper centering permitting a more accurate reading of the graduations (Figure 10). It is to be noted that the back face of the hub can be extended as indicated by reference numeral 55. During assembly operations, this permits the back face of the hub, which carries the hub graduations, to be flush with the back face of the coupling box, which carries the coupling box graduations, thus providing easy reading.

With the apparatus aforedescribed, it is possible to quickly assemble and disassemble the floating spindle coupling structure with a minimum of effort and with an optimum in efficiency, the apparatus providing a coupling assembly which permits a positive drive, a positive means of insuring accurate sealing for lubricant retention coupled with a minimum replacement of parts due to wear, and a maximum amount of misalignment.

The invention claimed is:

1. In a flexible coupling for connecting shaft ends, the combination of a pair of shafts having adjacent shaft ends with at least one of said shaft ends including a hub fixed thereto, said hub having a plurality of external gear teeth disposed thereon, a coupling box for connecting said adjacent shaft ends, said coupling box having a hub receiving opening disposed at one end thereof to receive said hub, said hub receiving opening having internal gear teeth disposed therein engageable with the external gear teeth on said hub, a sealing ring carrier disposed in said hub receiving opening of said coupling box and surrounding said shaft, a metallic segmental sealing ring floatingly mounted in said sealing ring carrier for transverse movement relative to the longitudinal axis of said shafts, spring means to urge yieldably said segmental sealing ring into sealing contact with said shaft, retaining means cooperating with said coupling box adjacent said sealing ring carrier to retain said sealing ring carrier within said coupling box, and means to secure the other end of said coupling box to the other of said adjacent shaft ends.

2. The apparatus of claim 1, said spring means comprising a garter spring surrounding the outer face of said segmental sealing ring.

3. In a flexible coupling for connecting shaft ends, the combination of a pair of shafts having adjacent shaft ends, with at least one of said shaft ends including a hub fixed thereto, said hub having a plurality of external gear teeth disposed thereon, said teeth each having side shapes generated by displacing an arc of involute so that each point of such arc lies on a curved trajectory which is in a plane perpendicular to a plane bisecting each tooth longitudinally, a coupling box for connecting said adjacent shaft ends, said coupling box having a hub receiving opening disposed at one end thereof to receive said hub, said hub receiving opening having internal gear teeth disposed therein engageable with the external gear teeth on said hub, metallic sealing ring means disposed in said hub receiving opening of said coupling box and yieldably urged into contact with said shaft, retaining means cooperating with said coupling box adjacent said sealing ring means to retain said sealing ring means in position, and means to secure the other end of said coupling box to the other of said adjacent shaft ends.

4. In a flexible coupling for connecting shaft ends, the combination of a pair of shafts having adjacent shaft ends with at least one of said shaft ends including a hub fixed thereto, said hub having a plurality of external gear teeth disposed thereon, a coupling box for connecting said adjacent shaft ends, said coupling box having a hub receiving opening disposed at one end thereof to receive said hub, said hub receiving opening having internal gear teeth disposed therein engageable with the external gear teeth on said hub, a sealing ring carrier disposed in said hub receiving opening of said coupling box and surrounding said shaft, a segmental metal sealing ring floatingly mounted in said carrier, a garter spring surrounding said sealing ring whereby said sealing ring is yieldably urged into contact with said shaft, a snap ring cooperating with said coupling box adjacent said sealing ring carrier to retain said sealing ring carrier within said coupling box, and means to secure the other end of said coupling box to the other of said adjacent shaft ends.

5. The apparatus of claim 4, wherein said coupling box hub receiving opening is frustum-shaped, tapering outwardly toward its entrance face, said sealing ring carrier being a mating frustum shape to nest in said opening.

6. The apparatus of claim 5, wherein said external gear teeth each have side shapes generated by displacing an arc of involute so that each point of such arc lies on a curved trajectory which is in a plane perpendicular to a plane bisecting each tooth longitudinally.

7. In a flexible coupling for connecting shaft ends, the combination of a pair of shafts having adjacent shaft ends with at least one of said shaft ends including a hub fixed thereto, said hub having a plurality of external gear teeth disposed thereon, a coupling box for connecting said adjacent shaft ends, said coupling box having a hub receiving opening disposed at one end thereof to receive said hub, said hub receiving opening having internal gear teeth disposed therein engageable with the external gear teeth on said hub, metal sealing ring means disposed in said hub receiving opening of said coupling box and yieldably urged into contact with said shaft, a snap ring cooperating with said coupling box adjacent said sealing ring means to retain said sealing ring means in position, said snap ring having handle portions integral therewith to permit quick removal and installation, and means to secure the other end of said coupling box to the other of said adjacent shaft ends.

8. In a floating spindle coupling assembly for connecting spaced drive and driven members, a first coupling box securable to one of said spaced members, said first coupling box having a hub receiving opening with $n$ number of internal gear teeth disposed therein, a second coupling box securable to the other of said spaced members, said second coupling box having a hub receiving opening with $n+$ at least one number of internal gear teeth disposed therein, a spindle positioned intermediate said first and second coupling boxes to transmit power from one member to the other, said spindle having a first hub at one end thereof with $n$ number of external gear teeth disposed thereon engageable with $n$ number of internal gear teeth disposed in the opening of said first coupling box and a second hub at the other end thereof with $n+$ at least one number of external gear teeth disposed thereon engageable with the $n+$ at least one number of internal gear teeth disposed in the opening of said second coupling box, and one tooth on said first hub being substantially in line with one tooth on said second hub and visual means for aligning said spindle for proper engagement of the hubs with their respective coupling boxes.

9. In a floating spindle coupling assembly for connecting spaced drive and driven members, a first coupling box securable to one of said spaced members, said first coupling box having a hub receiving opening with $n$ number of internal gear teeth disposed therein, a second coupling box securable to the other of said spaced members, said second coupling box having a hub receiving opening with $n+$ at least one number of internal gear teeth disposed therein, a spindle positioned intermediate said first and second coupling boxes to transmit power from one member to the other, said spindle having a first hub at one end thereof with $n$ number of external gear teeth disposed thereon engageable with $n$ number of internal gear teeth disposed in the opening of said first coupling box and a second hub at the other end thereof with $n+$ at least one number of external gear teeth disposed thereon engageable with the $n+$ at least one number of internal gear teeth disposed in the opening of said second coupling box, one tooth on said first hub being substantially in line with one tooth on said second hub, and index marking means for said coupling assembly to provide for alignment of the teeth of said spindle for proper engagement of the hubs with their respective coupling boxes.

10. In a floating spindle coupling assembly for connecting spaced drive and driven members, a first coupling box securable to one of said spaced members, said first coupling box having a hub receiving opening with $n$ number of internal gear teeth disposed therein, a second coupling box securable to the other of said spaced members, said second coupling box having a hub receiving opening with $n+$ at least one number of internal gear teeth disposed therein, a spindle positioned intermediate said first and second coupling boxes to transmit power from one member to the other, said spindle having a first hub at one end thereof with $n$ number of external gear teeth disposed thereon engageable with the $n$ number of internal gear teeth disposed in the opening of said first coupling box and a second hub at the other end thereof with $n+$ at least one number of external gear teeth disposed thereon engageable with the $n+$ at least one number of internal gear teeth disposed in the opening of said second coupling box, one tooth on said first hub being substantially in line with one tooth on said second hub, and index markings for said coupling assembly to provide for alignment of the teeth of said spindle for proper engagement of the hubs with their respective coupling boxes comprising equally spaced graduations marked on the face of the opening of one of said coupling boxes, said graduations coinciding with the centerlines of the internal gear grooves between the internal teeth of said marked coupling box and equally spaced graduations marked on the back face of the spindle hub engageable with said marked coupling box, said graduations on said spindle hub corresponding and being aligned with the centerlines of the external teeth on the other hub of said spindle, said graduations on said spindle hub further including a mark designating the one tooth on said hub substantially aligned with the one tooth on said other hub.

11. In a floating spindle coupling assembly for connecting spaced drive and driven members, a first coupling box securable to one of said spaced members, said first coupling box having a hub receiving opening with $n$ number of internal gear teeth disposed therein, a second coupling box securable to the other of said spaced members, said second coupling box having a hub receiving opening with $n+$ at least one number of internal gear teeth disposed therein, a spindle positioned intermediate said first and second coupling boxes to transmit power from one member to the other, said spindle having a first hub at one end thereof with $n$ number of external gear teeth disposed thereon engageable with the $n$ number of internal gear teeth disposed in the opening of said first coupling box and a second hub at the other end thereof with $n+$ at least one number of internal gear teeth disposed in the opening of said second coupling box, one tooth on said first hub being substantially in line with one tooth on said second hub, index markings for said spindle coupling assembly to provide for alignment of the teeth of said spindle for proper engagement of the hubs with their respective coupling boxes, comprising equally spaced graduations coinciding with the centerlines of the internal gear grooves between the internal teeth of said marked coupling box and equally spaced graduations marked on the back face of the spindle hub engageable with said marked coupling box, said graduations on said spindle hub corresponding and being substantially aligned with the centerlines of the external teeth on the other hub of said spindle, said graduations on said spindle hub further including a mark designating the one tooth on said hub substantially aligned with the one tooth on said other hub, and a retraction chamber in at least one of said coupling boxes adjacent said hub receiving opening to accommodate the spindle hub engageable with the internal teeth of such coupling box for free rotation with respect thereto when said spindle is retracted.

12. In a floating spindle coupling assembly for connecting two substantially aligned and spaced shafts, a first coupling box securable to one of said shafts, said first coupling box having a hub receiving opening with $n$ number of internal gear teeth disposed therein, a second coupling box securable to the other of said shafts, said second coupling box having a hub receiving opening with $n\pm$ at least one number of internal gear teeth disposed therein, a spindle positioned intermediate said first and second coupling boxes to transmit power from one shaft to the other, said spindle having a first hub at one end thereof with $n$ number of external gear teeth disposed thereon engageable with the $n$ number of internal gear teeth disposed in the opening of said first coupling box and a second hub at the other end thereof with $n\pm$ at least one number of external gear teeth disposed thereon engageable with the $n\pm$ at least one number of internal gear teeth disposed in the opening of said second coupling box, one tooth on said first hub being substantially in line with one tooth on said second hub, and index markings for said spindle coupling assembly to provide for alignment of the teeth of said spindle for proper engagement of the hubs with their respective coupling boxes, comprising $n$ number of graduations marked on the face of the opening of said first coupling box, said graduations coinciding with the centerline of the $n$ number of internal gear grooves between the $n$ number of internal teeth of said first box, and $n\pm$ at least one number of graduations marked on the back face of said first hub of said spindle in alignment with the centerlines of the $n\pm$ at least one number of external teeth on said second hub, said $n\pm$ at least one number of graduations including a mark designating the one tooth on said first hub substantially aligned with the one tooth on said second hub.

13. In a floating spindle coupling assembly for connecting two substantially aligned and spaced shafts, a first coupling box securable to one of said shafts, said first coupling box having a hub receiving opening with $n$ number of internal gear teeth disposed therein, a second coupling box securable to the other of said shafts, said second coupling box having a hub receiving opening with $n\pm$ at least one number of internal gear teeth disposed therein, a spindle positioned intermediate said first and second coupling boxes to transmit power from one shaft to the other, said spindle having a first hub at one end thereof with $n$ number of external gear teeth disposed thereon engageable with the $n$ number of internal gear teeth disposed in the opening of said first coupling box and a second hub at the other end thereof with $n+$ at least one number of external gear teeth disposed thereon engageable with the $n+$ at least one number of internal gear teeth disposed in the opening of said second coupling box, one tooth on said first hub being substantially in line with one tooth on said second hub, sealing ring means disposed in said hub receiving opening of at least one of said coupling boxes yieldably urged into engagement with said shaft adjacent said external gear teeth on said hubs, retaining means cooperative with said coupling boxes adjacent said sealing ring means to retain said sealing ring means in place, and indexing means for said shaft coupling assembly to provide for alignment of the teeth of said spindle for proper engagement of the hubs with their respective coupling boxes.

14. In a floating spindle coupling assembly for connecting two substantially aligned and spaced shafts, a first coupling box securable to one of said shafts, said first coupling box having a hub receiving opening with $n$ number of internal gear teeth disposed therein, a second coupling box securable to the other of said shafts, said second coupling box having a hub receiving opening with $n\pm$ at least one number of internal gear teeth disposed therein, a spindle positioned intermediate said first and second coupling boxes to transmit power from one shaft to the other, said spindle having a first hub at one end thereof with $n$ number of external gear teeth disposed thereon engageable with the $n$ number of internal gear teeth disposed in the opening of said first coupling box and a second hub at the other end thereof with $n\pm$ at least one number of external gear teeth disposed thereon engageable with the $n\pm$ at least one number of internal gear teeth disposed in the opening of said second coupling box, one tooth on said first hub being substantially in line with one tooth on said second hub, index markings for said spindle coupling assembly to provide for alignment of the teeth of said spindle for proper engagement of the hubs with their respective coupling boxes, comprising $n$ number of graduations marked on the face of the opening of said first coupling box, said graduations coinciding with the centerlines of the $n$ number of internal gear grooves between the $n$ number of internal teeth of said first box, and $n\pm$ at least one number of graduations marked on the back face of the first hub of said spindle in alignment with the centerlines of the $n\pm$ at least one number of external teeth on said second hub, said $n\pm$ at least one number of graduations including a mark designating the one tooth on said first hub substantially aligned with the one tooth on said second hub, a retraction chamber in at least one of said coupling boxes adjacent said internal gear teeth thereof to accommodate said hub when retracted, a sealing ring carrier disposed in said hub receiving opening of at least one of said coupling boxes and surrounding said spindle, a segmental metal sealing ring floatingly mounted in said carrier, a garter spring surrounding said sealing ring to urge yieldably said sealing ring into contact with said spindle, and a snap ring cooperating with said coupling box adjacent said sealing ring carrier to retain said sealing ring carrier in position.

References Cited in the file of this patent

UNITED STATES PATENTS

| | | |
|---|---|---|
| 1,638,378 | Trautner | Aug. 9, 1927 |
| 2,035,171 | Loewus | Mar. 24, 1936 |
| 2,055,014 | Manger | Sept. 22, 1936 |
| 2,136,947 | Morgan | Nov. 15, 1938 |
| 2,375,030 | O'Malley | May 1, 1945 |
| 2,510,414 | Philbrick | June 6, 1950 |
| 2,608,071 | Baudry | Aug. 26, 1952 |
| 2,729,477 | Hamilton | Jan. 3, 1956 |
| 2,744,449 | Belden et al. | May 8, 1956 |
| 2,769,323 | O'Malley | Nov. 6, 1956 |
| 2,807,483 | Cornelius | Sept. 24, 1957 |
| 2,845,781 | O'Brien | Aug. 5, 1958 |